United States Patent [19]
Sadoski

[11] Patent Number: 6,019,555
[45] Date of Patent: *Feb. 1, 2000

[54] DEBUR TOOL FOR SIMULTANEOUSLY REMOVING BURRS FROM AND CHAMFERING A HOLE IN A WORKPIECE

[75] Inventor: William J. Sadoski, Richmond, Tex.

[73] Assignee: Hudson Products Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/975,520

[22] Filed: Nov. 20, 1997

[51] Int. Cl.[7] ........................................ B23B 51/02
[52] U.S. Cl. ........................... 409/143; 408/93; 408/199
[58] Field of Search .................... 408/224, 223, 408/211, 199, 227, 24, 26, 30, 93, 150; 409/138, 140, 143

[56] References Cited

U.S. PATENT DOCUMENTS

| | | | |
|---|---|---|---|
| 2,442,554 | 6/1948 | Swiatek | 408/199 |
| 2,529,143 | 11/1950 | Eriksson | 408/224 |
| 3,022,686 | 2/1962 | Rowley | 408/199 |
| 3,063,148 | 11/1962 | Brilmyer | 408/199 |
| 3,109,222 | 11/1963 | Wiseman | 408/199 |
| 3,122,947 | 3/1964 | Cogsdill | 408/199 |
| 3,444,766 | 5/1969 | Eriksson | 408/211 |
| 3,473,421 | 10/1969 | Grussner | 408/211 |
| 3,564,948 | 2/1971 | Pomernacki | 408/211 |
| 4,032,251 | 6/1977 | Ribich | 408/199 |
| 4,842,451 | 6/1989 | Bugger | 408/211 |

FOREIGN PATENT DOCUMENTS 315601  10/1919  Germany ................................. 408/93

*Primary Examiner*—Daniel W. Howell
*Attorney, Agent, or Firm*—R. J. Edwards; Eric Marich

[57] ABSTRACT

A debur tool for simultaneously removing burrs from holes in a workpiece, such as those in a header box tube sheet, also has a beveled surface adjacent a cutting edge for chamfering an edge of the hole from which a burr is removed. The cutting edge is horizontally offset from a shaft carrying the cutting edge.

7 Claims, 3 Drawing Sheets

DEBUR TOOL FOR SIMULTANEOUSLY REMOVING BURRS FROM AND CHAMFERING A HOLE IN A WORKPIECE

FIELD AND BACKGROUND OF THE INVENTION

The present invention relates generally to the field of machining operations used in connection with the manufacture of industrial boilers and equipment and, in particular, to a new and useful tool for simultaneously deburring and chamfering holes in a plate workpiece, such as those in a boiler header box tube sheet.

Boiler tube and plug sheets,. referred to hereinafter as "boiler elements", are initially formed with many rough edges or burrs on their interiors which must be removed to finish the boiler elements for use If these burrs are not removed, once the boiler element is placed into service they could break off and be carried into other areas and plug passageways or cause other damage. The boiler elements should also be smooth to avoid undesirable flow characteristics.

Referring to FIG. 1, there is illustrated one known device for deburring such boiler elements, known as a "BUR-BAN" tool, and generally referred to as tool 10, available from the Gruich Tool and Manufacturing Company. This tool 10 is a manually operated cutter, and as shown in FIG. 1, the BUR-BAN tool 10 has a main shaft or body portion 12 of relatively constant diameter D, and a pair of long, slender semi-circular shaft legs 14 connected to the main shaft or body portion 12 with a central gap 16 extending along and between the pair of shaft legs 14. The BUR-BAN tool 10 has cutting edges 18 which are positioned above rounded ends 19 of the shaft legs 14. The cutting edges 18 extend radially outwardly from the longitudinal axis of the tool 10, on the surface of each of the shaft legs 14. Top and bottom surfaces of each of the cutting edges 18 are substantially flat and perpendicular with respect to the shaft legs 14 and the longitude axis of the BUR-BAN tool 10.

In use, the BUR-BAN tool 10 is inserted longitudinally through a hole in boiler element, such as a boiler tube header, to debur the hole. The central gap 16 allows the shaft legs 14 to flex, thereby facilitating insertion and removal of the tool 10 from an opening whose diameter is close to that of the tool 10. The tool 10 is then rotated to cut the burrs off the inside of the boiler element connection. Under certain conditions, the tool 10 must be sharpened frequently, which decreases the speed at which these boiler elements can be deburred. The tool 10 also lacks any means to chamfer the edge of the boiler element connection at the time it is deburred, and it is operated solely by hand.

A modified version of the BUR-BAN tool 10 of FIG. 1 was developed and is illustrated in FIG. 2. This modified tool, generally designated 20, also has a main shaft or body portion 22, a pair of long, slender semi-circular shaft legs 24 connected to the main shaft or body portion 22 with a central gap 26 extending along and between the pair of shaft legs 24, and a pair of cutting edges 28 as before. However, in contrast to the BUR-BAN tool 10, and for a modified tool 20 designed to debur a similar-sized boiler connection, both the main shaft or body portion 22 and the pair of shaft legs 24 of the modified tool 20 have a diameter $D_1$ which is less than the diameter D of a BUR-BAN tool 10 used for the same deburring application. Further, while the cutting edges 28 of the modified tool 20 are also provided above rounded ends 29 of each of the shaft legs 24 provided on an end portion 30 of the modified tool 20, this end portion 20 has a larger diameter than that of the main shaft or body portion 22, and preferably the same diameter D as used in the BUR-BAN tool 10. The modified tool 20 may also be provided with a reduced diameter opposite end 32 of diameter $D_2$, to facilitate its use in combination with a drill (hand-held or stationary) or air motor. The reduced diameter $D_1$ facilitates insertion of the modified tool 20 into a boiler element that is to be deburred, but like the tool 10, it also is incapable of expeditiously chamfering the boiler element connection at the time it is deburred.

SUMMARY OF THE INVENTION

It is an object of the present invention to provide an improved debunring tool which can also simultaneously chamfer a hole, and which has a longer useful life and which may be operated by machine.

Accordingly, a recess debur tool comprising an elongated shaft having a beveled cutting member at one end and a chuck connection at the other end is provided. The beveled cutting member has a blade edge perpendicular to and horizontally offset from the longitudinal axis of the shaft. The top surface of the blade edge is beveled at about 30° from the longitudinal axis.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
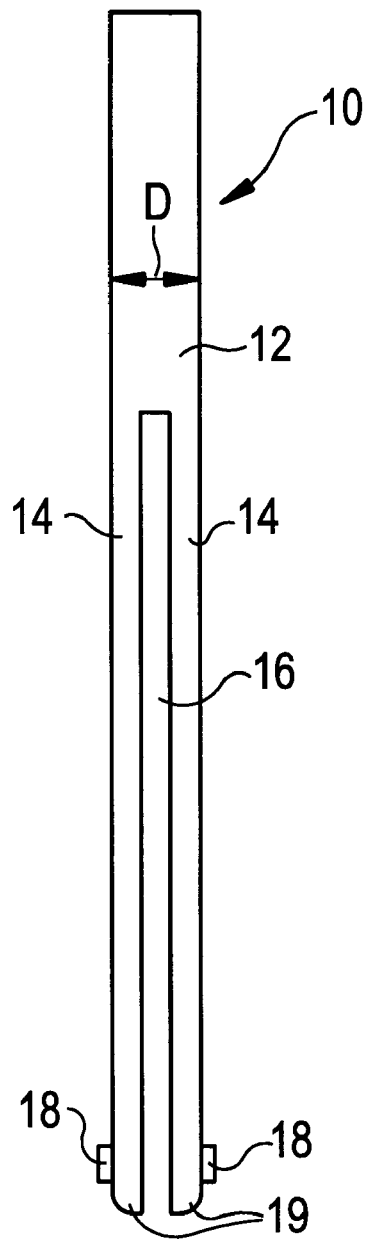
FIG. 1 is a front elevational view of one known deburring tool.
Figure 2:
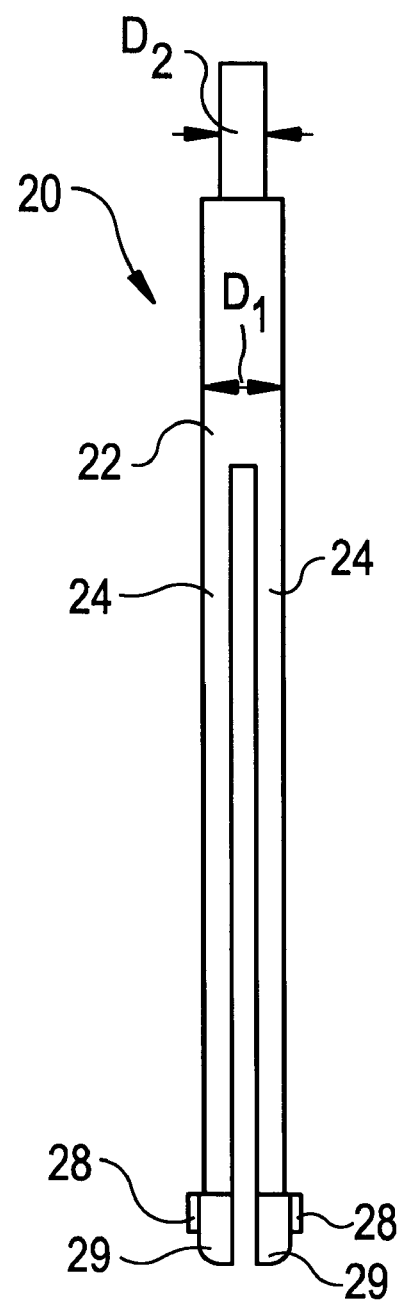
FIG. 2 is a front elevational view of a modified version of the known deburring tool of FIG. 1.
Figure 3:
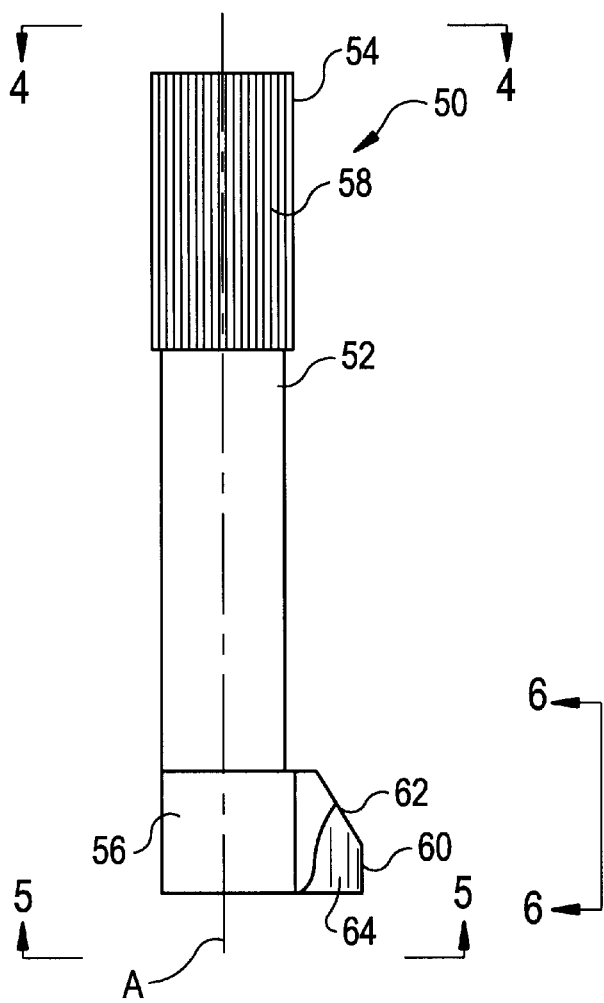
FIG. 3 is a front elevational view of a cutting tool of the invention.
Figure 4:
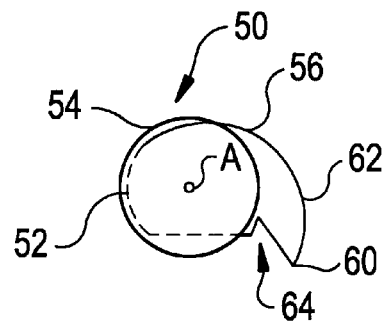
FIG. 4 is a top plan view of the cutting tool of FIG. 3, viewed in the direction of arrows 4—4.
Figure 5:
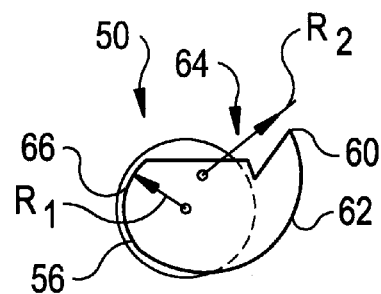
FIG. 5 is a bottom plan view of the cutting tool of FIG. 3, viewed in the direction of arrows 5—5.
Figure 6:
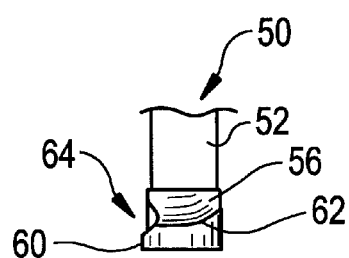
FIG. 6 is a right side elevational view of a lower portion of the cutting tool of FIG. 3, viewed in the direction of arrows 6—6.

Referring now to the drawings, wherein like reference numerals designate the same or functionally similar elements throughout the several drawings, FIGS. 3–6 illustrate several views of a recess debur tool 50 according to the present invention. Recess debur tool 50 has an elongated shaft 52 with chuck end 54 and cutting end 56.

Elongated shaft 52 and chuck end 54 are cylindrical. Chuck end 54 has a plurality of longitudinal ridges or splines 58 around its circumference. Chuck end 54 may be inserted within a drill press chuck (not shown) or other device to rotate the tool 50. Ridges 58 assist a chuck in gripping chuck end 54

Cutting end 56 has a cutting blade 60 which is horizontally offset from and approximately parallel with a longitudinal axis A of shaft 52. The top surface of the cutting blade 60 is a beveled surface 62. The beveled surface 62 slants from the cutting edge 60 in toward shaft 52 at about a 30° angle from the longitudinal axis A, as shown. A notch 64 is formed in the cutting end 56 between the cutting edge 60 and the shaft 52, as part of the horizontal offset, so that cutting edge 60 and beveled surface 62 is a sharp blade.

The vertical side of cutting end 56 has a portion 66 opposite the cutting edge 60 with a first radius of curvature $R_1$. The circumference of the portion of the cutting end 56 forming cutting edge 60 has a greater radius of curvature $R_2$. The different radii of curvature $R_1$, $R_2$ create the horizontal offset of cutting edge 60 from the longitudinal axis A of shaft 52.

Figure 7:
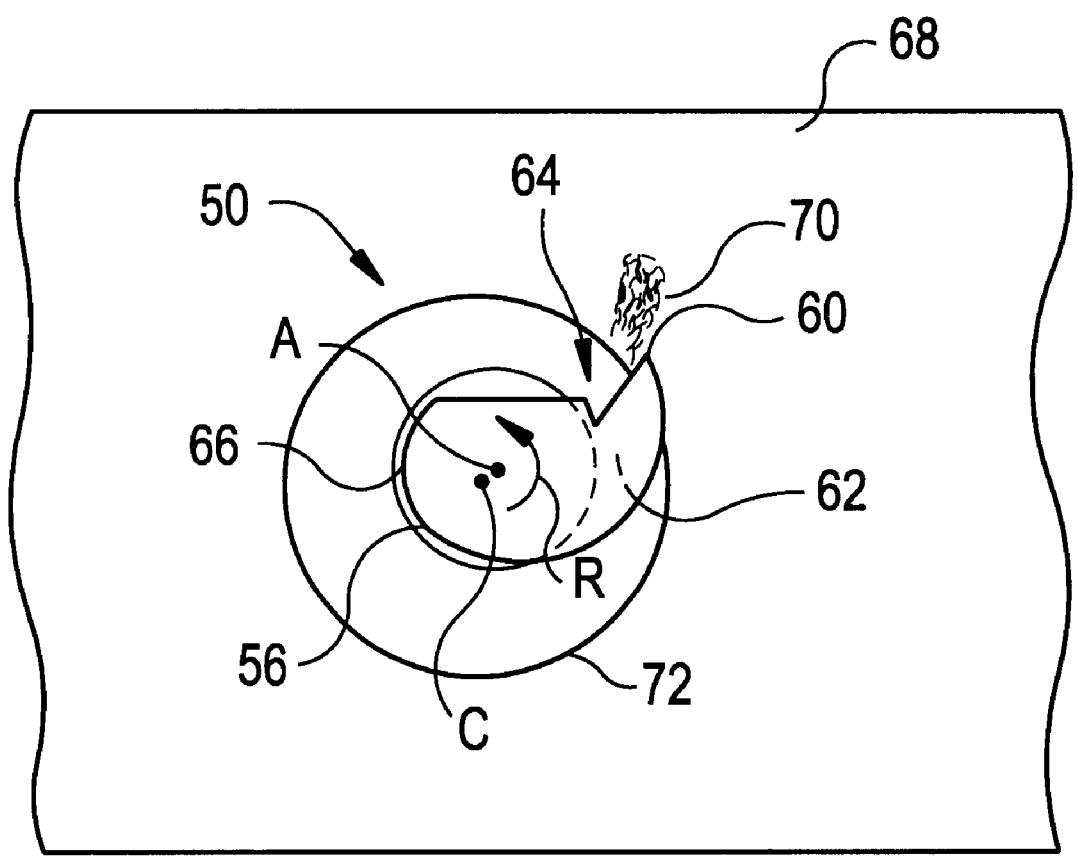
FIG. 7 is a view of an underside portion of a plate workpiece illustrating how the cutting tool of the invention can be used to simultaneously remove a burr from an edge of a hole and chamfer the edge of the hole.

FIG. 7 displays the effect of using the tool 50 to debur holes in plate workpiece 68, such as a header box tube sheet 68. A burr 70 is created when a hole 72 is placed in the workpiece 68.

In a preferred embodiment of the invention, the tool 50 is approximately 3" long, the splined end 54 being approximately 1" long, the elongated shaft 52 is approximately 1.56" long with a 0.440" diameter, and the cutting end 56 is approximately 0.440" long. A diameter across the widest portion of the cutting end 56 is preferably approximately ¾". In addition, the first radius of curvature $R_1$ is approximately 0.221", while the second radius of curvature $R_2$ is approximately 0.355". This embodiment would be suitable to debur and chamfer holes 72 approximately 1" diameter. Of course, with suitable variation of sizes of the features of tool 50, other size holes 72 could also be deburred and chamfered. For example, to debur a hole 72 which is approximately 1½" diameter, the splined end 54 would increase to approximately 0.625" diameter. The diameter across the widest portion of the cutting end 56 would remain at approximately ¾", $R_1$ and $R_2$ would remain the same, and the 30° angle of the beveled edge 62 would also be maintained. Similarly, the overall length of the debur tool 50 is determined by the thickness of the material to be deburred. The thicker the material, the longer the tool 50 needs to be in order to reach the bottom of the hole 72, and is generally only up to 1½" thick material. Regardless of the diameter of the hole 72, the same general design features, dimensions, and angles would be observed.

In use, tool 50 is connected to a device, such as a drill press or manually-operated shaft, for rotating the cutting blade edge 60 of the tool 50. The tool 50 is then inserted through the hole 72 and cutting edge 60 is positioned adjacent the burr 70. Tool 50 and cutting edge 60 are rotated in the direction R of the cutting edge 60 and beveled edge 62, so that the curing edge 60 comes in contact with the burr 70 and carves it away from the edge of the hole 72, leaving a clean surface. The beveled edge 62 of the cutting edge 60 of the tool 50 contacts the edge of the hole 72 during cutting away of the burr 70 and thus chamfers the edge of the hole 72, thereby providing a desirable finish and a clean hole 72 surface in the workpiece 68.

The tool 50 is held in a tool holder (not shown) of known design, such as a Maxwell tool holder, which facilitates insertion of the tool 50 into hole 72, and also serves to "kick" it out or move it laterally approximately ³⁄₃₂" to ⅛ once the tool is placed through the hole 72. As shown in FIG. 7, the longitudinal axis of symmetry A of the tool 50 is not the same as a center C of the hole 72. This lateral movement or "kick out" is provided by the tool holder (not shown). Thus, in use, the tool 50 is not only rotated at a high speed about its axis A, but also the axis A of tool 50 is rotated about the center C of the hole 72 as the hole 72 is simultaneously deburred and chamfered. Of course, the diameter across the widest portion of the cutting end 56 must be slightly less than the diameter of the hole 72.

The cutting action provided by the tool 50 of the invention has a longer useful life than other known tools used for this purpose. The tool 50 may be mounted to a drill or other device for rotating the tool 10 and does not have to be used manually, as with other known devices. The tool 50 of the invention has the added advantage of being capable of chamfering the hole 72 from where the burr 70 is removed, which is not possible with known devices. It is not limited to use in deburring holes 72 in header box tube sheets, but instead could be used to simultaneously debur and chamfer any hole 72 in a plate workpiece 68.

While a specific embodiment of the invention has been shown and described in detail to illustrate the application of the principles of the invention, it will be understood that the invention may be embodied otherwise without departing from such principles.

I claim:

1. A debur tool for simultaneously removing burrs from a hole in a plate workpiece and chamfering an edge of the hole, comprising:

an elongated shaft with a substantially constant diameter and a central longitudinal axis the elongated shaft having two distinct ends;

a chuck area, the chuck area being positioned at one end of the elongated shaft;

a cutting area, the cutting area being positioned at the other end of the elongated shaft, the cutting area having a variable diameter which is greater than the substantially constant diameter of the elongated shaft, a portion forming a vertical side of the cutting area which is parallel to the central longitudinal axis of the elongated shaft, and a first radius $R_1$ measured from the central longitudinal axis of the elongated shaft to the portion forming the vertical side;

a cutting edge connected to the cutting area, the cutting edge being oriented parallel to the central longitudinal axis of the elongated shaft, positioned on a portion of the cutting area which is opposite the portion forming the vertical side of the cutting area; and having a radius $R_2$ measured from the outermost portion of the cutting edge to a point which is horizontally offset from the central longitudinal axis of the elongated shaft, wherein $R_2$ is greater than $R_1$; and chamfer means including a beveled surface connected to the cutting area adjacent the cutting edge for chamfering the edge of the hole.

2. The debur tool according to claim 1, wherein the variable diameter of the cutting area is equal to or greater than the substantially constant diameter of the elongated shaft and wherein the cutting area further comprises a blunt terminal end at which the maximum of the variable diameter of the cutting area is located.

3. The debur tool according to claim 1, wherein the beveled surface is inclined at about 30° relative to the longitudinal axis toward the elongated shaft.

4. The debur tool according to claim 1, wherein a diameter across a widest portion of the cutting end is approximately ¾", $R_1$ is approximately 0.221" and $R_2$ is approximately 0.355".

5. The debur tool according to claim 2, wherein the maximum of the variable diameter of the cutting area is approximately 0.75"; wherein $R_1$ is approximately 0.221"; and wherein $R_2$ is approximately 0.355".

6. The debur tool according to claim 5, wherein $R_1$ represents one half of the minimum of the variable diameter of the cutting area and wherein $R_1$ represents the substantially constant diameter of the elongated shaft.

7. The debur tool according to claim 6, wherein the maximum of the variable diameter of the cutting area is approximately 0.75"; wherein $R_1$ is approximately 0.221"; and wherein $R_2$ is approximately 0.355".

* * * * *